United States Patent [19]
Ishimitsu

[11] Patent Number: 5,202,774
[45] Date of Patent: Apr. 13, 1993

[54] IMAGE READING APPARATUS

[75] Inventor: Yoshiyuki Ishimitsu, Hino, Japan

[73] Assignee: Konica Corporation, Tokyo, Japan

[21] Appl. No.: 552,064

[22] Filed: Jul. 13, 1990

[30] Foreign Application Priority Data

Jul. 14, 1989 [JP] Japan .................. 1-180177
Jul. 10, 1990 [JP] Japan .................. 2-183668

[51] Int. Cl.5 ............................................. H04N 1/40
[52] U.S. Cl. ......................... 358/488; 358/401; 358/474; 358/475; 358/480; 358/449; 358/453; 358/471
[58] Field of Search ............ 358/449, 488, 452, 453, 358/498, 496, 474, 75, 487, 97, 214, 215, 480, 481, 485; 356/4, 140, 141; 250/206.1, 206.2, 557; 382/48

[56] References Cited

U.S. PATENT DOCUMENTS

| 2,360,883 | 10/1939 | Metcalf | 356/380 |
| 4,617,469 | 10/1986 | Takahashi et al. | 250/557 |
| 4,682,242 | 7/1987 | Sugita | 358/452 |
| 4,769,679 | 9/1988 | Matsumoto | 355/41 |
| 4,875,104 | 10/1989 | Kamon | 358/474 |

FOREIGN PATENT DOCUMENTS

| 58-66173 | 4/1983 | Japan | 358/488 |
| 58-114563 | 7/1983 | Japan | 358/488 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

An image reading apparatus that illuminates or irradiates a document by scanning for reading in two orthogonal directions. In a mode preceding a reading mode, it photoelectrically converts transmitted or reflected light into an image signal, employs a stored threshold value for comparison with the image signal, and discriminates document position or size based on the comparison to set a reading area for the document, such as a medical X-ray film. A reading control inhibits the reading mode while the document is irradiated in the sub-scanning direction from its tip edge across a predetermined distance. The discrimination of a possibly faulty position, including some inclination error, of the X-ray film and the setting of the reading area compensates for the faulty position before the subsequent reading mode begins. The setting of the reading area can involve some re-conveying of the document. An alarm is generated if the discrimination determines that an appropriate reading area cannot be set. Different types of amplification are provided for the discrimination and for the subsequent reading by a switching arrangement based on a discrimination of the operating mode.

5 Claims, 9 Drawing Sheets

IMAGE READING APPARATUS

BACKGROUND OF THE INVENTION

The present invention relates to an image reading apparatus capable of precisely reading an image region using a simple mechanism.

There is such a conventional image reading apparatus which scans an image medium like an X-ray film with a light beam before converting image data into a digital signal.

Taking a medical X-ray film reading apparatus for example, this apparatus scans an image in the main scanning direction with a laser beam while conveying the X-ray film in the subscanning direction along a conveying guide, and then photoelectrically converts light transmitted through or reflected from the X-ray film before eventually generating an image signal. A photodetector is provided in the laser-beam scanning width and outside of film conveying path. After detection of scanned light with the photo-detector, based on the predetermined timing, an image-reading section is established.

FIG. 1 illustrates an example of an image-reading-signal generating circuit of a conventional image reading apparatus. The reference numeral 100 designates an address counter which counts input picture-element clock units and then clears the counted value by applying a horizontal synchronizing signal. The reference numeral 200 designates ROM storing data. The reference numeral 300 designates a latch circuit which latches data read out of the ROM 200 and then outputs it as an image signal.

If such data like 111, 1000, and 11, were preliminarily written in the ROM 200 in order that these data can be read out synchronous with picture-element clock, as shown in FIG. 2, after passing a certain time on receipt of horizontal synchronizing signal, image reading signal (shown as negative logic in FIG. 2) can constantly be generated. If image-reading signal generating circuit had the composition like the one cited above, a reading region of a film can be adjusted by applying the timing of an image reading signal which is generated based on the horizontal synchronizing signal. In other words, the reading region can be adjusted by rewriting data in the ROM 200. Once the data of the ROM 200 is determined, based on the stationary timing, the image reading signal is output from the horizontal synchronizing signal. As a result, if the position of film-conveying guide were stationary, image can be read within an accurate range.

Nevertheless, there are a variety of faults in any conventional image reading apparatus. For example, film conveying guide may wobble itself, and yet, depending on the degree of installation precision, image reading position may deviate. If this occurs, an image in some portions cannot properly be read to eventually result in the partial dropout of image data. Conversely, the image reading system may erroneously read the exterior of the film. Even if the image portion were specified by coordinate, since the film position deviates, the specified region cannot precisely be shown. Although such a deviation can be eliminated by applying adjustment during production process, it in turn raises cost. And yet, even if the adjustment were properly done, mechanical structure may wobble itself while operating the image reading apparatus for a long period of time, and then the image reading position will eventually deviate.

The conventional image reading apparatus cited above detects the film size by means of a plurality of microswitches disposed in the main scanning direction at the predetermined intervals. Nevertheless, this system still has those problems mentioned below.

First, the film-size detecting method with a number of microswitches needs to use a large number of component parts. This in turn obliges assembly operators to perform complicated work to install these parts and perform position adjustment.

Next, the size of the film used for medical X-ray photography has been standardized into the following five kinds. The Japanese Laid-Open Patent Publication No. 60-46660 of 1985 suggests that four units of microswitches are just enough to detect the size of the medical X-ray film.

| Width in the main scanning line (inch) | Width in the subscanning line (inch) |
| --- | --- |
| 8 | 10 |
| 10 | 12 |
| 11 | 14 |
| 14 | 14 |
| 14 | 17 |

Nevertheless, when reading the size of X-ray films having specific sizes other than the above, more than four of microswitches must be provided, thus resulting in the extremely complex mechanism. Furthermore, when introducing a number of microswitches, reliability and durability of mechanical contacts and actuators must carefully be taken into account. Although either the photointerruption type or the reflection type photosensing switches may be introduced in place of microswitches, those problems cited above still remain unsolved. Needless to say that, when introducing reflection-type photosensors, reflection sheet must be provided on the side opposite from those photosensors.

SUMMARY OF THE INVENTION

The object of the invention is to provide a novel image reading apparatus capable of correctly reading an image region in correspondence with the conveying position and the size of image medium using simple structure.

To achieve the above object, according to the invention, the image reading apparatus compares signal output from photoelectric conversion means (which converts light transmitted through or reflected from an image medium into an electric signal) to the predetermined threshold value, and then detects the relative position of the image medium in the reading region or the size of the image medium before eventually setting the range of reading image medium in correspondence with the detected value.

BRIEF DESCRIPTION OF THE DRAWINGS

FIG. 9-b illustrates data stored in line memory;

DESCRIPTION OF THE PREFERRED EMBODIMENTS

Figure 3:
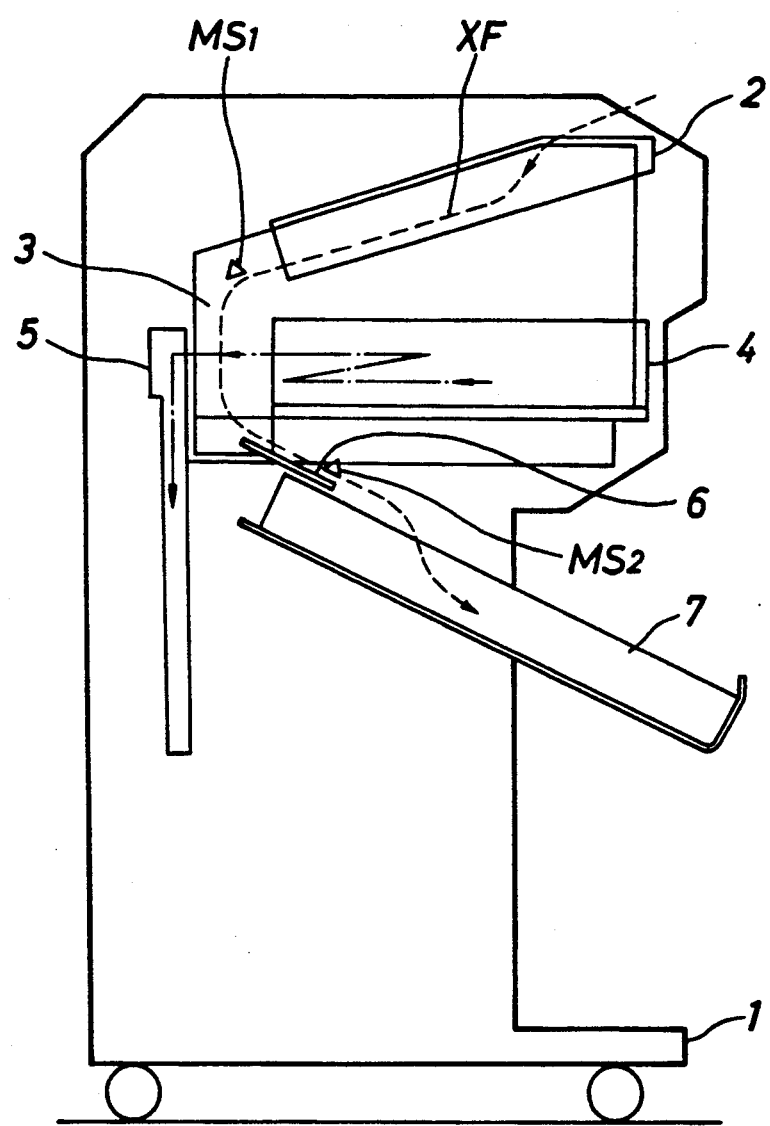
FIG. 3 illustrates the sectional view of the image reading apparatus according to an embodiment of the invention.

Referring now to the accompanying drawings, an embodiment of the invention is described below. FIG. 3 illustrates the sectional view of the image reading apparatus embodied by the invention. Film mount 2 is installed in the upper space of the main frame. Each of X-ray films XF on the film mount 2 is conveyed by a film-conveying unit 3 incorporating a pulse motor 16. Each film XF is conveyed through an interim path between an optical unit 4 and a photoreceptive unit 5 in the state of facing downward. As the film XF passes by, an image reading apparatus reads image from it. The film XF is then conveyed along film-ejection guide 6 before eventually being delivered to ejected-film container 7. Microswitch $MS_1$ is installed in the position immediately behind the film mount 2 along the film-conveying path. Microswith $MS_2$ is installed in the bottom edge of the film-ejection guide 6. When the microswitch $MS_1$ turns ON, film-conveying pulse motor 16 (which will be described later on) is activated. When the microswitch $MS_2$ turns OFF, the microswitch $MS_1$ detects that the film XF is discharged out of the mechanism.

Figure 4:
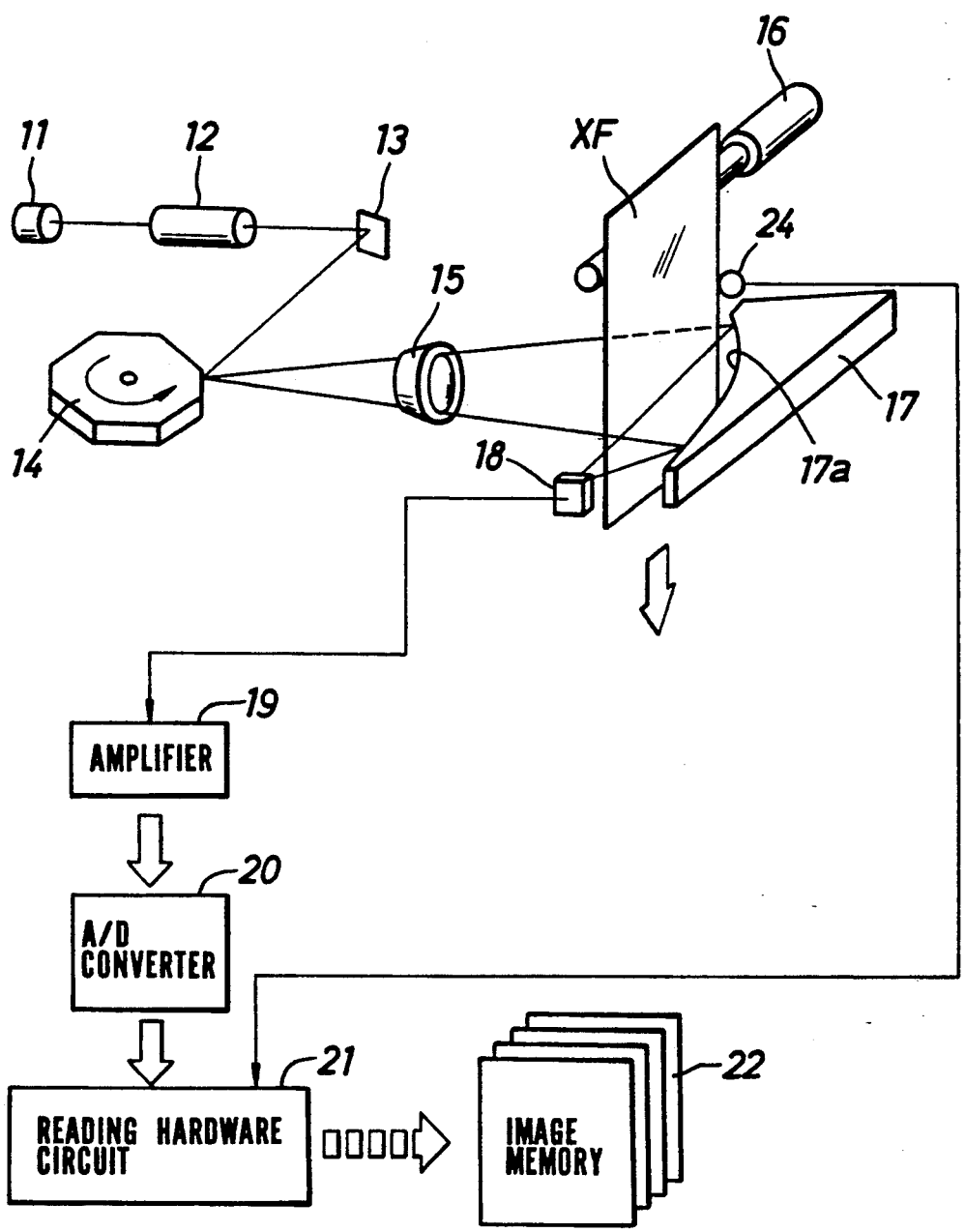
FIG. 4 illustrates the schematic block diagram of essential components of the image reading apparatus embodied by the invention.

FIG. 4 illustrates the schematic block diagram of the optical unit 4 and the photoreceptive unit 5 of the image reading apparatus embodied by the invention. A laser beam emitted from laser-beam source 11 like a semiconductor laser is initially shaped by collimator lens 12. Upon being reflected by a mirror 13, the shaped laser beam is led to a rotary polygonal mirror 14 which horizontally rotates at a fast speed. Laser beam reflected by the rotary polygonal mirror 14 passes through $f\theta$ lens 15 which focuses image at a specific distance proportional to incident angle $\theta$ with respect to the light axis. Since the X-ray film XF is conveyed facing downward by the pulse motor 16 of the film-conveying unit 3, the entire surface of the X-ray film XF is scanned by the incident laser beam. After passing through the X-ray film XF, the laser beam is then reflected by a reflection surface 17a of an elliptical-mirror type condenser 17 before being condensed and received by photodiode 18. The reflection surface 17a of the condenser 17 is a portion of an elliptical shape, while the photodiode 18 is set to the focussing position near one end of the elliptical shape. In place of the photodiode 18, either a photomultiplier tube or a photodiode array may also be used. Likewise, in place of the condenser 17, any substitutive element made of plastic fibers or acrylic resin, or lens, may also be used.

Image signal generated by photodiode 18 via photoelectric conversion is then amplified by amplifier 19, where the image signal is logarithmically converted into density signal. The density signal is then converted into digital signal by A/D (analog to digital) converter 20, and then delivered to reading hardware circuit 21 to compensate for the shading before being stored in image memory 22. Alternatively, the digital signal is delivered to host computer B (which is outside of the image reading apparatus) via interface circuit like SCSI or GPIB instead of storage in the image memory 22.

Figure 5:
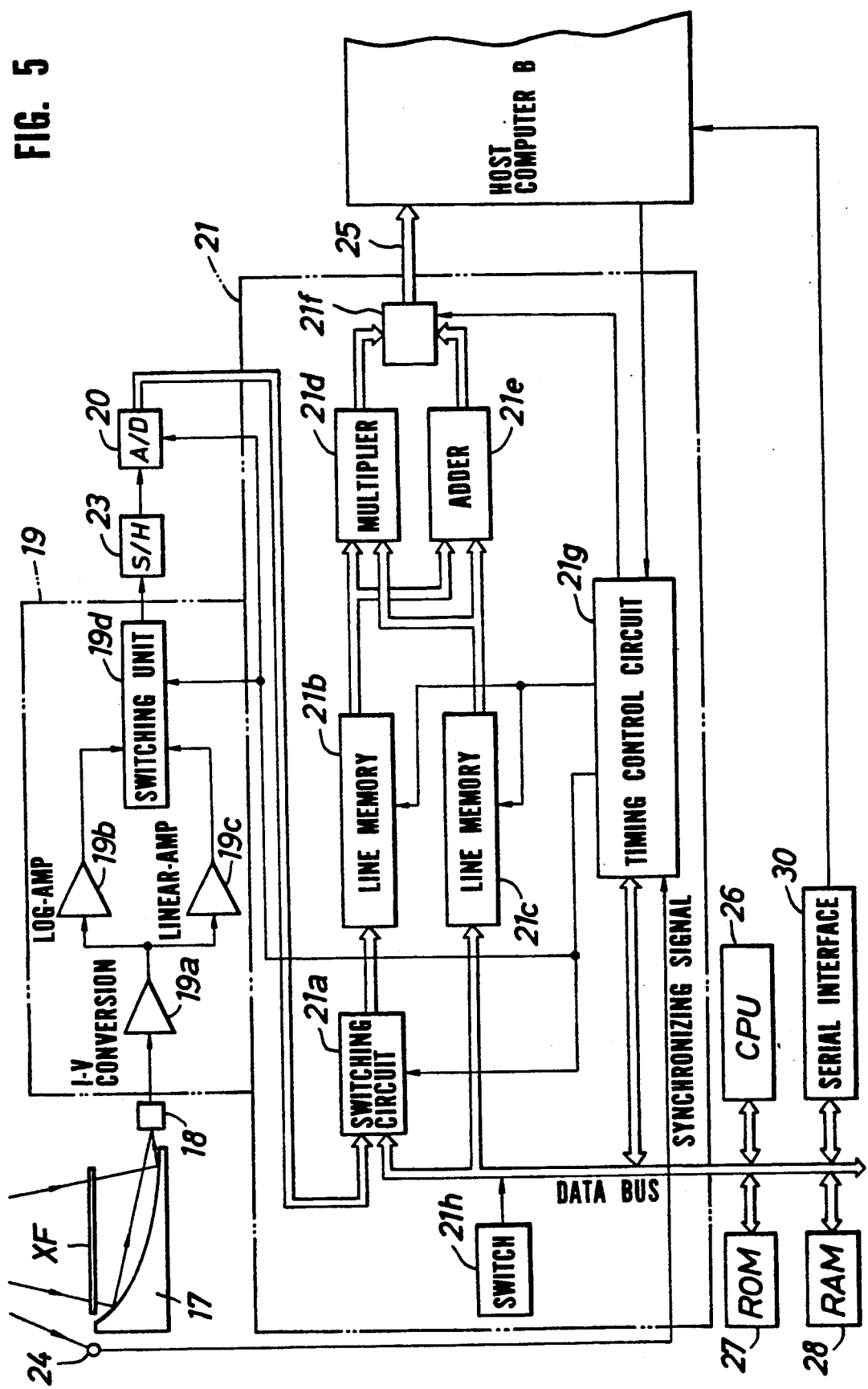
FIG. 5 illustrates the detailed block diagram of the image reading apparatus shown in FIG. 4.

FIG. 5 illustrates the detailed block diagram of the photoreceptive unit. After passing through the X-ray film XF, the laser beam is then converted into electrical signal by the photodiode 18. The electrical signal is then delivered to the amplifier 19 and sample-hold circuit 23, and then converted into a digital signal by the A/D converter 20 before being delivered to the reading hardware circuit 21. The reading hardware circuit 21 receives a synchronizing signal (which functions as a process-timing signal) from photodetector 24 which detects a scanned beam. A digitalized image signal from the reading hardware circuit 21 is then transmitted to the host computer B via a parallel signal line 25. Central Processing Unit (CPU) 26 incorporates program-storing ROM 27 and RAM 28, while the CPU 26 transmits and receives command data to and from the host computer B via a serial signal line 29 and a serial interface 30.

The image signal generated by the photodiode 18 via photoelectric conversion is delivered to the amplifier 19, where the current-voltage converting amplifier 19 converts a current signal into a voltage signal, and then delivers the voltage-converted signal to a log amplifier 19b and a linear amplifier 19c. Switching unit 19d selects either of these signals processed by the log amplifier 19b and linear amplifier 19c, and then delivers the selected signal to the sample-hold circuit 23 and the A/D converter 20 for generating digital signal. In this embodiment of the invention, the log amplifier 19b and the linear amplifier 19c are respectively operated, where either of these amplifiers can be selected by a switching signal from a timing-control circuit 21g. Unless switching operation is needed, neither the log amplifier 19b nor the linear amplifier 19c is activated. In particular, when solely operating the log amplifier 19b, conversion of current into voltage is not needed.

Digital image signal from the A/D converter 20 is delivered to the reading hardware circuit 21, and then part of this image data corresponding to one-scan, lot is stored in the first line memory 21b via the switching circuit 21a. On arrival of an image-data-request signal from the external host computer B, the stored image data is mathematically processed by either multiplier 21d or adder 21e together with shading compensation data before eventually being delivered to the host computer B. When operating the log amplifier 19b, the adder 21e is operated, whereas when operating the linear amplifier 19c, the multiplier 21d is operated.

The reference numeral 21g designates a timing-control circuit controlling memories and other elements.

The timing-control circuit 21g is controlled by an interface-control signal (IF signal) from the host computer B. The reference numeral 21h designates a switching circuit for selecting either the log amplifier 19b or the linear amplifier 19c.

Now, taking a medical X-ray film for example, the density remains minimum when the X-ray film is not exposed to light at all. While this condition is present, only the density of the film-base material is available, and thus, this is conventionally called "base density" which is normally rated to be 0.17.

Figure 1:
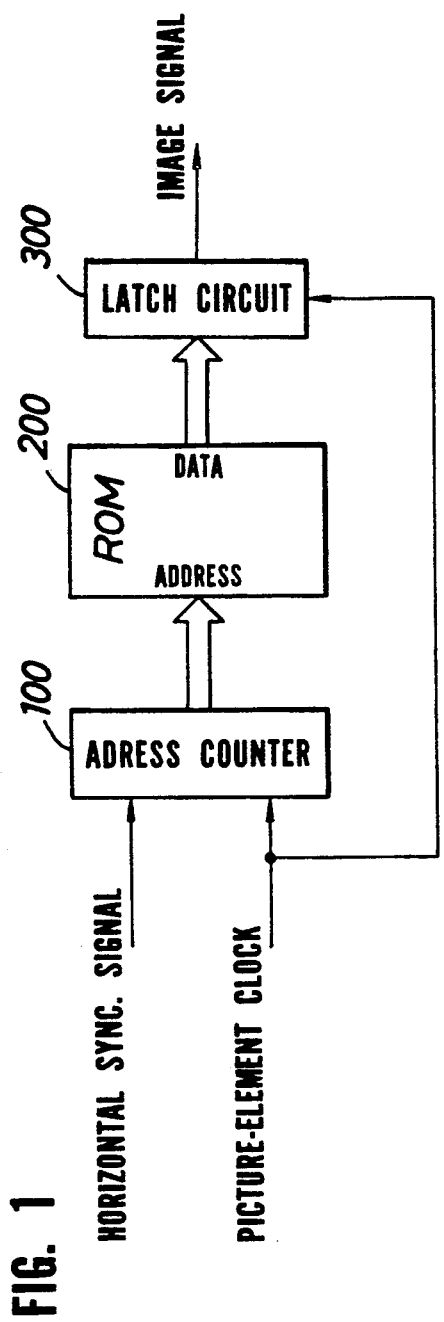
FIG. 1 illustrates the simplified block diagram of an image-reading-signal generating circuit of a conventional image reading apparatus.
Figure 2:
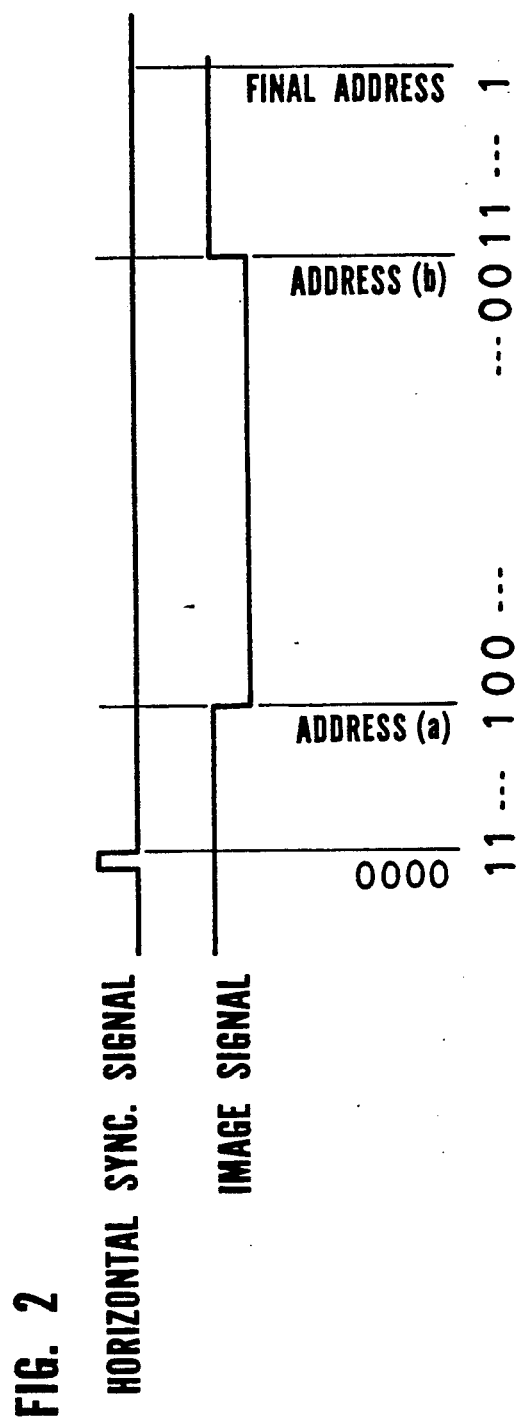
FIG. 2 illustrates the timing chart of an image reading signal generated from the circuit shown in FIG. 1.

When image reading element sees nothing, in other words, when the scanning light directly arrives at condenser 17 (shown in FIG. 2), this condition is defined to be "zero density". Presence or absence of the film can be detected by detecting the difference between "zero density" and "base density".

Now, a consideration is given to the case in which the photodiode 18 is available for photoelectric conversion and the input of the log amplifier 19b is connected to the input of the linear amplifier 19c. If the log amplifier 19b is of the current-input type, the photodiode 18 can be connected to it directly. Assume that the A/D converter 20, connected behind these amplifiers converts 0 through 10 v. from digital value 0 into 1024 for example. If there were 0 v. of output value, of the log amplifier 19b generated from the "zero-density" condition in which scanning element receives no image, then the gain and offset value of the log amplifier 19b are respectively predetermined so that the output from the log amplifier 19b can rise by 2.5 V when the density value rises by 1.

In order to digitalize an image read from the film, a clock signal must be supplied to the A/D converter 20 and subsequent memory system. Normally, in order to determine the timing that should be taken in those picture elements to be read, clock signal is synchronized with the synchronizing signal generated by the photodetector 24. As a result, it is convenient for the system to use the number of the counted clock signal (i.e., the number of pulse) for identifying the position and size of the film.

Figure 6:
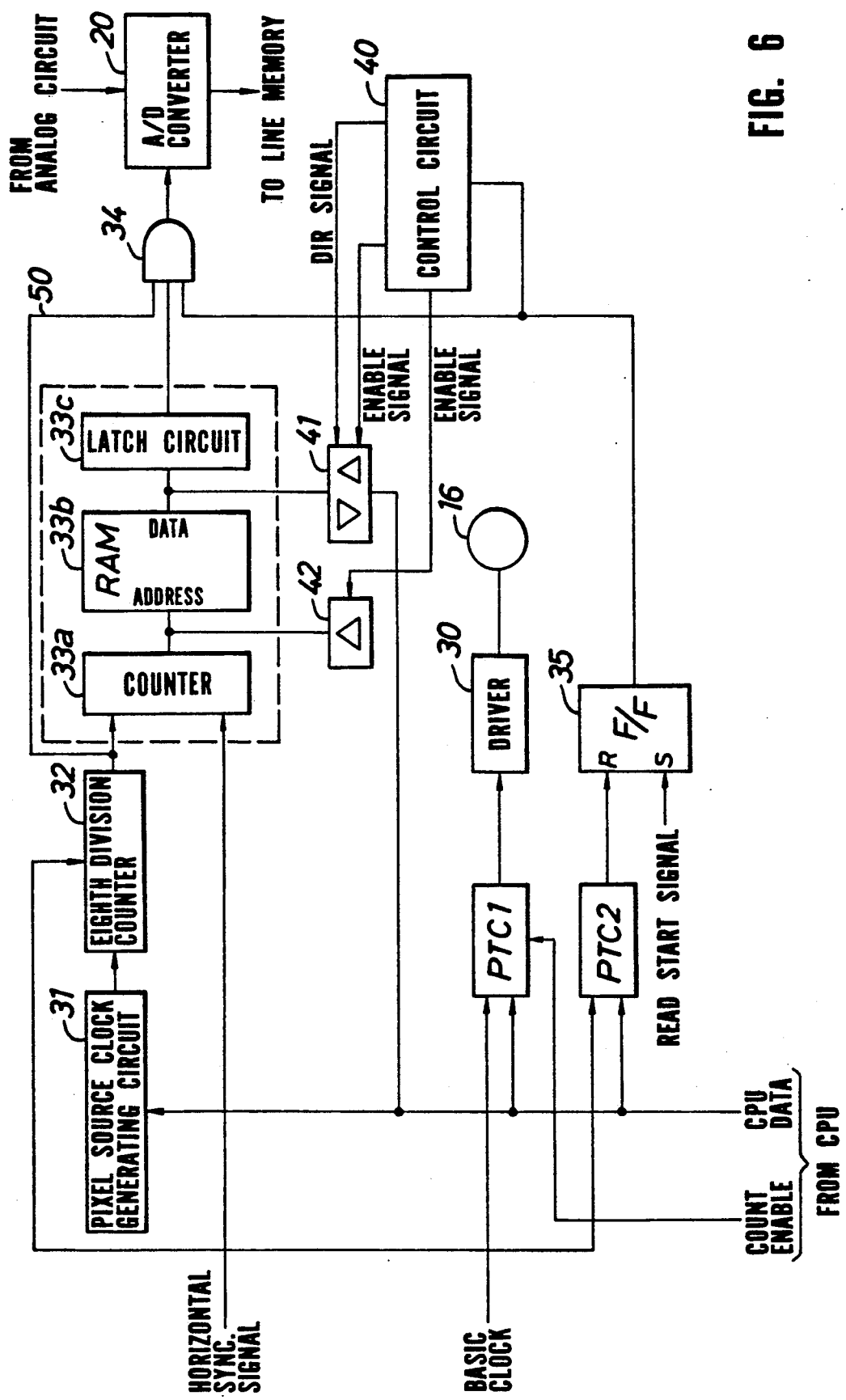
FIG. 6 illustrates the detailed circuit block diagram explanatory of the image reading operation of the image reading apparatus embodied by the invention.

FIG. 6 illustrates the detailed block diagram of the circuit used for the image reading operation of the image reading apparatus embodied by the invention. The reference numeral 31 designates a pixel source clock generating circuit which generates a clock signal for delivery to eighth division counter 32 and gate 34. The pixel source clock generating circuit 31 is composed of a PLL circuit or a programmable timer like "INTEL" 8252. The reference characters PTC1 and PTC2 respectively designate a programmable timer counter substantially composed of NEC μPD71054, for example. Normally, several hundred through several thousand KHz of clock signal is delivered to the pulse motor 16 for conveying the film. The basic clock frequency of the pixel source clock generating circuit 31 is determined by taking the maximum operating frequency of the programmable timer counters PTC1 and PTC2 and the divided bit number of counter into consideration. Since the NEC μ71054 has 16 bits counter, approximately 5 MHz of the basic clock frequency is adequately applicable.

The eighth-division counter 32 connected behind the pixel source clock generating circuit 31 is cleared synchronously with the horizontal synchronizing (H-SYNC) signal, and thus, deviation of the output pixel pulse against the horizontal synchronizing signal is constantly suppressed to a maximum of one-eighth clock. This clock is used for composing pixel clock 50 and gated by image-reading signal from RAM sequencer 35 and gate 34 before being fed to the A/D converter 20 as a sample clock.

The RAM sequencer 33 is composed of an address counter 33a, a RAM 33b, and a latch circuit 33c. The RAM sequencer 33 generates an image-reading region signal 51 which determines the image reading timing in the main scanning direction. Since the scanning beam scans the surface of the film at a constant speed, the timing determines the physical image reading region by applying the horizontal synchronizing signal. The address counter 33a receives pixel clock from the eighth-division counter 32 and uses the horizontal synchronizing signal for the cleaning signal. Accordingly, optional timing can be generated by properly rewriting data of the RAM 33b by activating the CPU 26 shown in FIG. 3. Buffers 41 and 42 respectively facilitate the CPU 26 to read and write the content of the RAM 33b. An enable signal and a directional (DIR) signal are respectively generated by the operation of the CPU 26 for controlling control circuit 40, thus executing control.

The programmable timer counter PTC2 counts the number of image-reading lines. The main scanning operation always starts synchronous with the horizontal synchronizing signal. The PTC2 identifies the number of actually read image lines by counting the number of the horizontal synchronizing signal. Flip flop 35 is activated by a reading-start signal generated by external circuit like the CPU 26 and reset by the counting end signal from the PTC2. While the flip flop 35 remains activated, image-reading mode is underway to cause image-reading-underway signal 1.52 to be output. The sample clock delivered to the A/D converter 20 makes use of the signal containing pixel clock 50 which is gated by the image-reading region signal 51 and the image-reading-underway signal 52.

Figure 7:
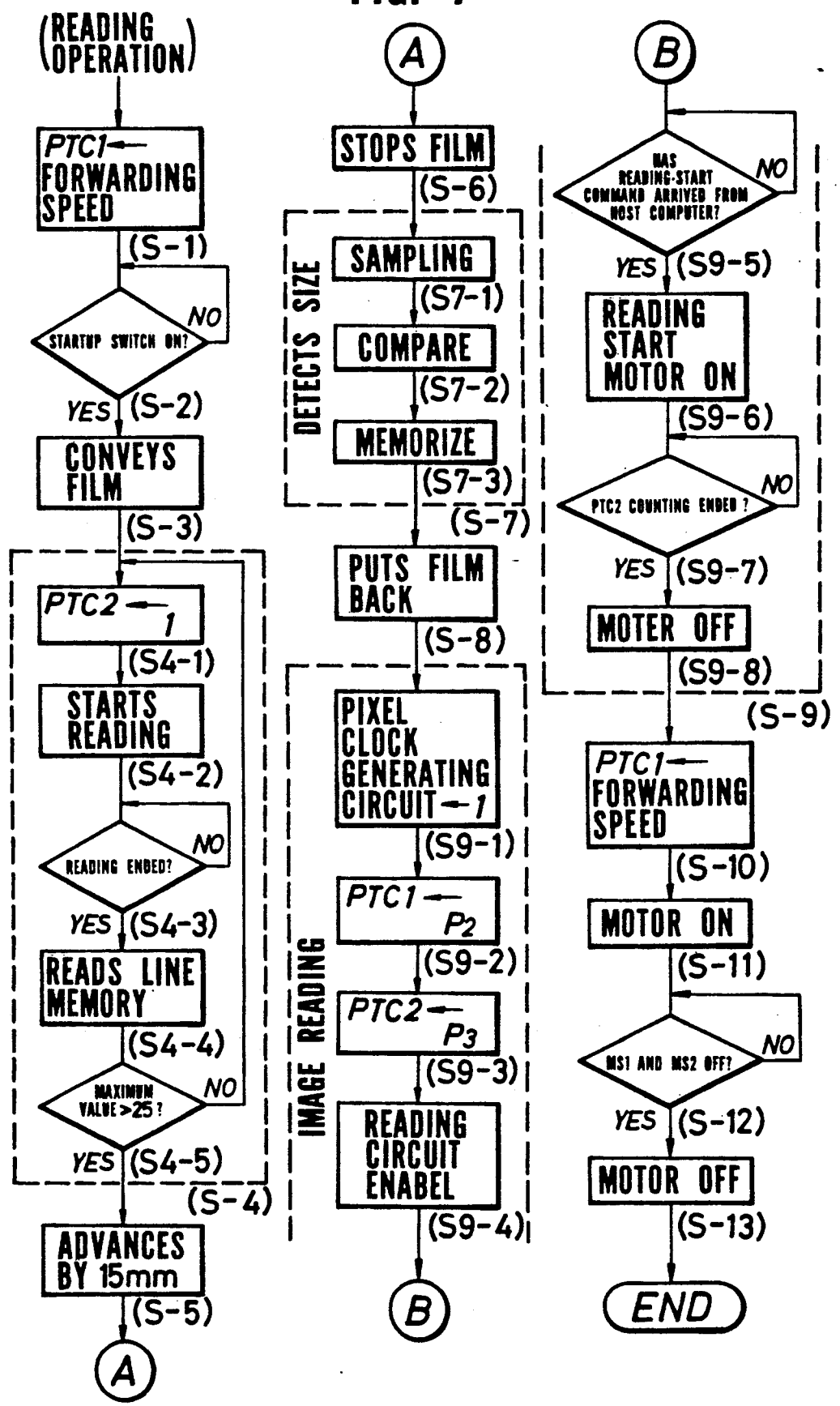
FIG. 7 illustrates the operational flowchart showing the image reading processes of the image reading apparatus embodied by the invention.

FIG. 7 illustrates the image-reading operational flowchart of the image-reading apparatus embodied by the invention. In accordance with the flowchart, sequence of the image-reading operation is described below.

When step S-1 is entered, a basic clock as the CPU data is delivered to the programmable timer counter PTC1, and then a specific value for setting forwarding speed is established. Next, when step S-2 is entered, the CPU 26 identifies whether startup switch is activated, or not. As soon as the startup switch turns ON, the pulse motor 16 is activated to carry the X-ray film XF forward. Concretely, the programmable timer counter PTC1 enters into countingenable condition so that it can generate the basic clock to drive the pulse motor 16 via driver 30. As a result, step S-3 is entered to activate conveying of the X-ray film XF.

Next, step S-4 is entered to activate, the initial-position setting operation (surrounded by broken lines as shown). Concretely, the count 1 is set to the PTC2 during step S4-1 so that it can output image-reading startup signal. As a result, image-reading circuit starts to read image during the next step S4-2, and then stops the image reading operation as soon as the image data corresponding to one-main-scanning lot is written in the line memory 21b or 21c during the next step S4-3. When step S4-4 is entered, the CPU 26 reads this data from the line memory 21b or 21c, and then causes the X-ray film XF to be carried forward without cease in the subscanning direction until reaching maximum threshold value 25, in other words, until the digitalized depth value exceeds 0.1 during the next steps S4-5. When the maximum threshold value exceeds 25, it indicates that the tip edge of the X-ray film XF is just on the scanning line.

When this condition is entered, an optimal value can be set to the pixel source clock generating circuit 31. Conversely, if a low-frequency value were set, it degrades the accuracy in detecting the film position. On the other hand, if a high-frequency value were set, it results in the expanded capacity of the needed line memory. The relationship between the f-value of the $f\theta$ lens 15, the number of the rotation of the polygonal mirror 14 (rpm), the pixel source clock frequency F, and the physical size P (m) of pixel, is expressed by the equation shown below.

$$F(Hz) = \frac{\pi f R}{15 P} \times 8 \qquad (1)$$

On the other hand, when the rotary polygonal mirror 14 scans an image, sections can be divided into those parts including the one in which image is actually scanned and the other retrace section. However, the scanning beam in the retrace section is not incident upon the condenser 17 at all, and thus, actually, signal output from the photodiode 18 contains extremely high density.

Figure 8:
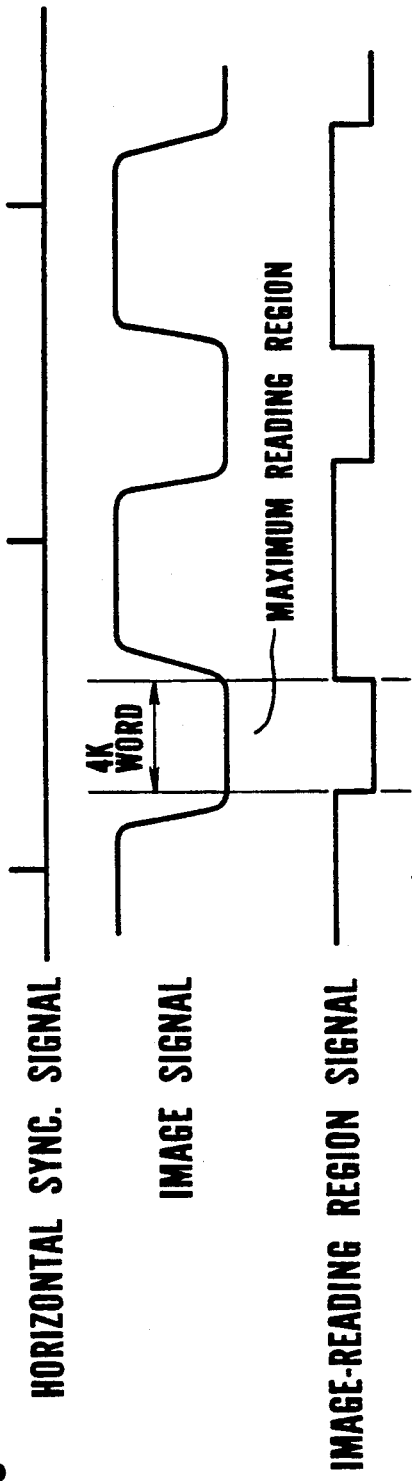
FIG. 8 illustrates the timing chart showing operation of the image signal and the image-reading region signal.

Accordingly, as shown in FIG. 8, when the image-reading region signal 51 is output based on a timing which is beyond the maximum reading region and enters in the retrace section, the image-reading system reads (samples) signal present in high-density portion, and thus, the system cannot correctly detect the film size.

Normally, any medical X-ray film reading apparatus has a maximum of 400 mm of image-reading region. If a line memory had 4 K-word of capacity (where 1 word is dependent on the bit number of the A/D converter 20 having 10 bit in this embodiment, then the size of one pixel is calculated to be $$\frac{400}{4096} = 97 \ [\mu m].$$

Now, this value is substituted in the preceding equation (1), in which the value of "f" 380 and the value of "R" 2000, respectively. In consequence, the pixel source clock frequency is determined to be F=13 (MHz). This permits the system to establish 1013 MHz of oscillation frequency for operating the pixel source clock generating circuit 31.

The image reading apparatus of the invention can read the maximum reading width based on the maximum density (accuracy) to maximize the accuracy of the film position which is to be detected by writing a specific value in the RAM sequencer 33 in order that only the section between addresses $a_1$ and $a_2$ can be "true".

The image reading apparatus executes sampling of each line by applying those established values shown above. The CPU 26 checks data of the line memories 21b and 21c to identify whether the maximum data value exceeds 25 (corresponding to 0.1 of depth), or not. If the data value exceeds 25 of the maximum limit, it indicates that the tip edge of the film is just on the scanning line. The above description has solely referred to the operation for establishing the initial film position.

When the X-ray film XF further goes forward by 15 mm from the original tip position during step S-5, the image reading apparatus halts the movement of the film XF in the next step S-6. The apparatus executes step S-5 to properly take corrective measure against round corners of the X-ray film XF. Normally, any medical X-ray film has round corners called "round corners". Although depending on the standard of the X-ray film manufacturers, normally, the roundness has about 10 mm of radius. If the image reading apparatus determines the film position by scanning the round corners, it incorrectly determines the film position far from the actual one. To prevent this, the image reading apparatus embodied b the invention compulsorily detects the tip edge of the X-ray film XF at first, and then conveys the film in the subscanning direction by 2 through 30 mm (actually, by 15 mm in this embodiment) before detecting the actual film position.

Figure 9:
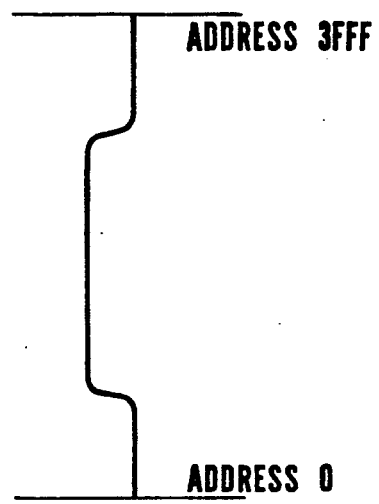
FIG. 9-a illustrates the timing chart of an image signal generated by the image reading apparatus of the invention.
Figure 9:
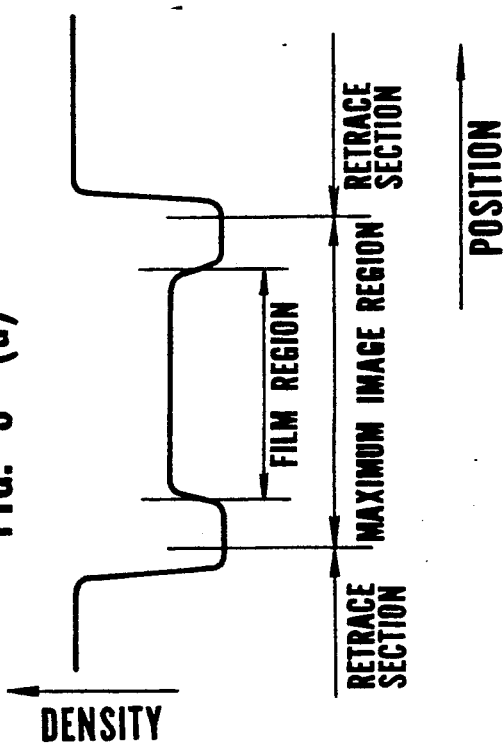

When the following step S-7 is entered (surrounded by broken line), the image reading apparatus of the invention detects the size of the X-ray film XF. When the film is present in the reading region, the image signal looks like the one shown in FIG. 9-a. When reading (sampling) image corresponding to one scanning lot, data in the line memory looks like the one shown in FIG. 9-b. The CPU 26 sequentially reads the content of the line memories 21a and 21b, and then compares the read-out data to the present threshold value (normally, this value is stored in the program-storing RAM as part of program) before storing the crossed addresses as an information. These sequential processes are described below.

When step S7-1 is entered, sampling of one-line data is again executed. Sampled data is then digitalized and stored in the line memory 21b, and then the content of this memory is scanned by the CPU 26 before being compared to the predetermined threshold value (25 V in this embodiment of the invention) by the CPU 26 during the following step S7-2. Memory addresses A and B crossing the threshold value are stored in the RAM 28 which is directly connected to the CPU 26. The above description has just referred to the film-size detecting operation of the image reading apparatus embodied by the invention.

Figure 10:
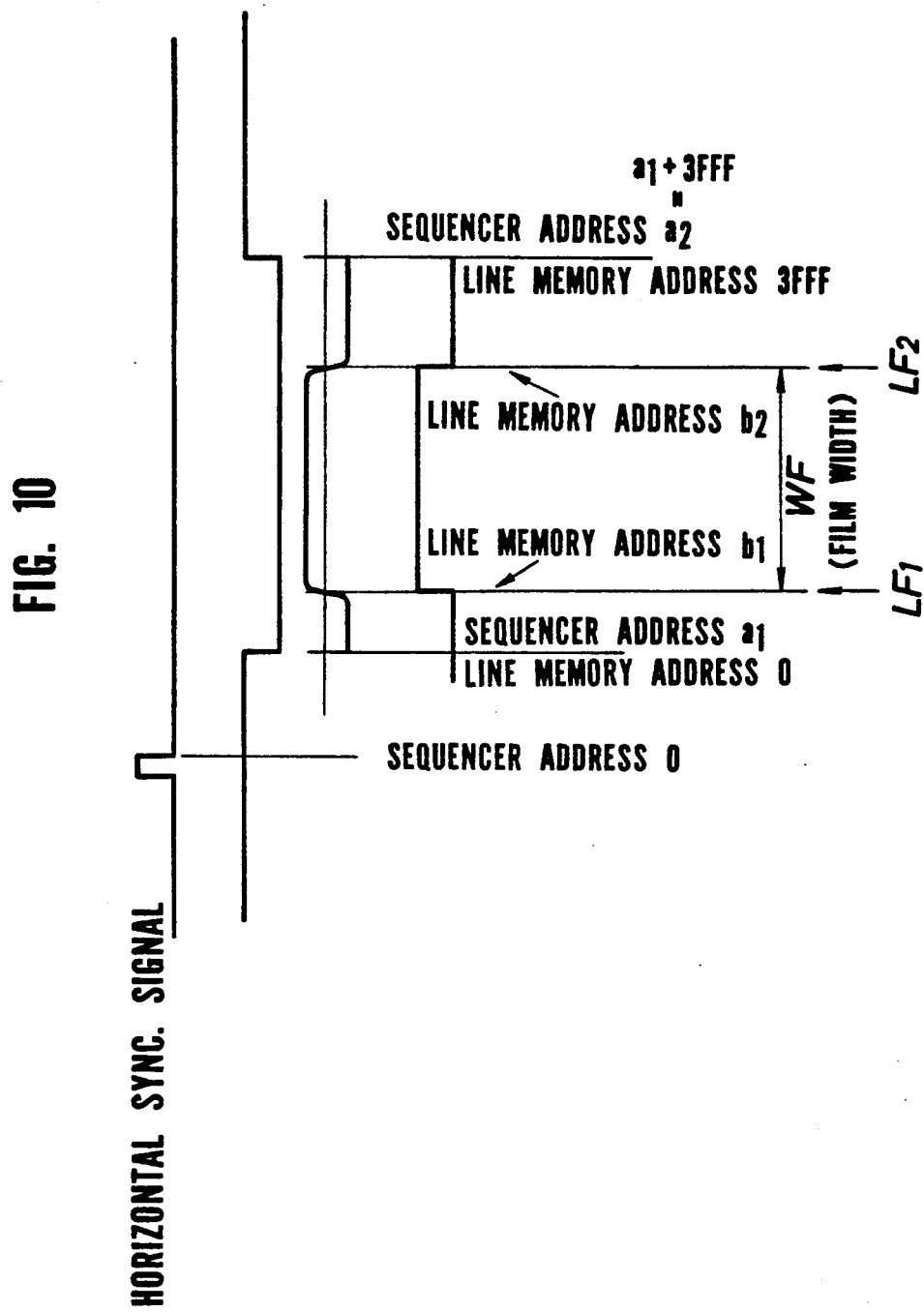
FIG. 10 illustrates memory addresses against image signal.

Since A and B are acknowledged to be the address values, the film size can be computed by the expression WF=97[$\mu$m]$\times$(B−A). Based on this value, the film size in the main scanning direction can be identified. Furthermore, based on the horizontal synchronizing signal, as shown in FIG. 10, distance up to the edge of the film can be computed by the expression LF1=97[$\mu$m]$\times$($a_1+b_1$) (the one close to the horizontal sync. signal) and LF2=97[$\mu$m]$\times$($a_1+b_2$) (the one far from the horizontal sync. signal).

When reading the X-ray film by applying 2048 words, the size of each pixel can be computed by applying the expression $$P = \frac{WF}{2048}.$$

The pixel source clock frequency F can be computed by applying the preceding equation (1). The value that should be set to the RAM sequencer 33 may be the one in order that only the section between LF1 and LF2 can be "true". Taking addresses of the RAM sequencer 33 for example, the section between ($a_1+b_1$) and ($a_2+b_2$) is true and the rest being false. As mentioned earlier, when the programmable timer counter PTC1 enters into counting-enable condition, the pulse motor 16 is driven by clock signal (composed of the basic clock which is divided into $1/P_2$th) via the driver 30. Phase-shifting speed of the pulse motor 16 corresponds to the clock frequency from the programmable timer counter PTC1. This in turn varies the size of pixel in the sub-scanning direction when being read. This depends on $P_2$.

Referring again to the flowchart shown in FIG. 7, when the next step S-8 is entered, the X-ray film XF which moved forward for correcting the round corner is again back to the original position. Next, step S-9 is entered, in which the image reading apparatus starts to read image from the tip edge of the X-ray film XF. Reading processes are defined in the surrounding broken line.

Concretely, when step S-9 is entered, value $P_1$ in the main scanning direction is set to the pixel source clock generating circuit 31 as the value specifying the size of the pixel to be read. Next, step S9-2 is entered, in which value $P_1$ in the subscanning direction is set to the programmable timer counter PTC1. Next, step S9-3 is entered, in which reading-line number $P_3$ is set to the programmable timer counter PTC2.

Next, step S9-4 is entered, in which the image-reading circuit enters into the reading-enable condition, and then, when the next step S9-5 is entered, the CPU 26 identifies whether the reading-start command has arrived from the host computer B, or not. On arrival of this command, step S9-6 is entered, in which reading process starts off simultaneous with the delivery of set signal to the flip flop 35, and simultaneously, the film-conveying pulse motor 16 is activated. In this way, image data is read from each line of the X-ray film XF. Next, step S9-7 is entered, in which the CPU 26 identifies whether the programmable timer counter PTC2 has actually counted horizontal synchronizing signal by the round corresponding to the preset counting value $P_3$, or not. If the preset counting rounds were already counted up, the CPU 26 identifies that the reading from the reading region is completed, and then stops the rotation of the film-conveying pulse motor 16 in the next step S9-8. The above description has just referred to the reading processes.

Next, step S-10 is entered, in which forwarding-speed setting value (as the CPU data) is set to the programmable timer counter PTC1. Next, step S-11 is entered, in which the film-conveying pulse motor 16 is again activated to start ejection of the X-ray film XF.

Next, step S-12 is entered, in which the CPU 26 identifies whether the microswitches $MS_1$ and $MS_2$ (which are installed along the film-conveying path for detecting the film) are respectively turned OFF, or not. When all the steps are OFF after completing ejection of the X-ray film XF, the CPU 26 stops the rotation of the film-conveying pulse motor 16 in the final step S-13.

When executing those sequential processes mentioned above, even if there were error in the installation position of the film conveying guide, the image reading apparatus can securely detect actual film position and read image data. As a result, the apparatus can correctly read image region. Furthermore, since the actual film position can be detected precisely, unlike any conventional image reading apparatus, there is no need of delicately adjusting the image reading position. Also, unlike any conventional apparatus, the invented image reading apparatus can correctly detect the size of X-ray film using a simple mechanism without installing a number of microswitches.

Figure 11:
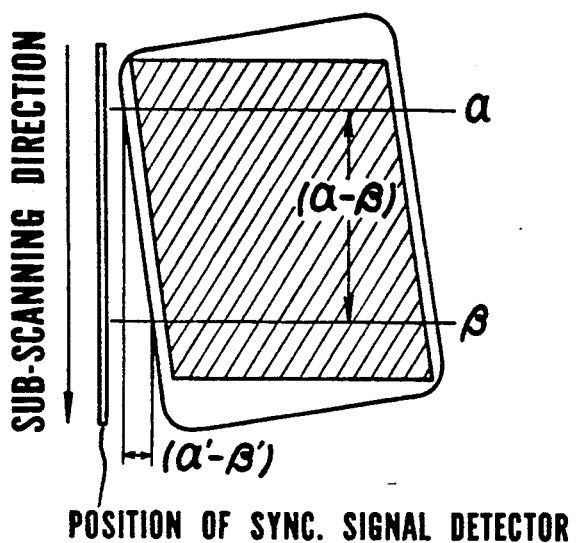
FIG. 11 illustrates the image reading operation when an X-ray film is obliquely inserted.

The image reading apparatus related to the above embodiment initially detects the film position, and then executes image reading operation based on the detected film position. Nevertheless, if the film meanders itself, image position at the tip and bottom edges will differ from each other. To compensate for this, the invention can also introduce such a method to detect the incline of the film at first and then read image in correspondence with the incline. For example, as shown in FIG. 11, when the film inclines itself, based on the method just mentioned, the apparatus can detect the film position at points $\alpha$ and $\beta$ shown in FIG. 11. Based on the distance between points $\alpha$ and $\beta$ and the difference between both ends of the film, the inclined angle of the inserted film can be computed. The film-reading starting position can be read by correcting each scanning process. Nevertheless, since the main scanning line cannot incline itself, actually, reading is applied to the tilted line portion shown in FIG. 11. Normally, the meandering symptom can be suppressed by physical precision of mechanical parts. Unless the film operator intentionally inclines the film, the meandering angle can remain at a maximum of 5°. Consequently, even if there were such shadowed reading region shown in FIG. 11, practically, there is no critical problem at all. This mechanism is particularly effective when installing an automatic film feeding system which dispenses with manual film insertion. Even the slightest incline of the automatically inserted film can be corrected by virtue of the above method to permit the image reading apparatus to correctly read the film.

When the inserted film inclines, instead of correcting the reading position, it is also possible for the image reading apparatus to draw the inclined film back to the inlet aperture and then warn the operator to correctly insert the film with an alarming means. Alternatively, it is also possible for the apparatus to output either a warning message or a status message to the host computer B. In this case, the apparatus can perform normal reading operation instead of renewing the reading operation based on the correction of the incline of the film.

Figure 12:
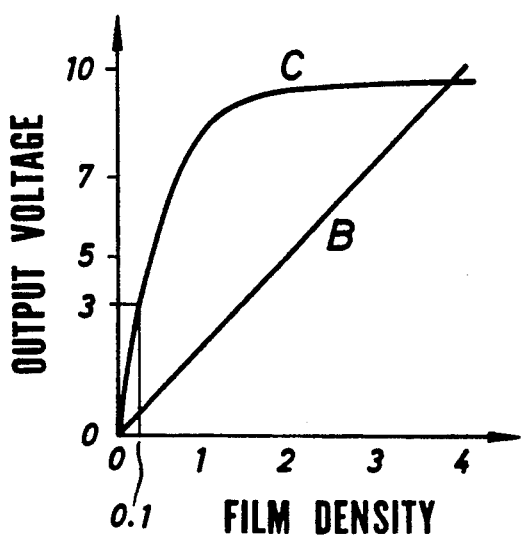
FIG. 12 illustrates output characteristic of the linear amplifier and the log amplifier of the image reading apparatus of the invention against film density.

A signal for detecting the film position or size can be output from either the log amplifier 19b or the linear amplifier 19c shown in FIG. 5. For example, when the output characteristic of the linear amplifier 19c against the film density corresponds to the curve C shown in FIG. 12 in the condition in which the film density has varied from 0 to 0.1, the output value of the linear amplifier 19c varies from 0 to about 3 V. After the A/D conversion, the numerical value corresponds to such an extensive variation from 0 to 300. Compared to the log amplifier 19b having output value varying from 0 to 25, the linear amplifier 19c has extremely wide variation of the output value. In other words, the linear amplifier 19c generates quite substantial variation rate in the dynamic range, and thus, it is extremely useful for detecting the film position and size. Based on this reason, it is suggested that the operator advantageously use voltage output from the linear amplifier 19c while detecting the film position and size and switch over to the log amplifier 19b before normally reading image.

Advantageous Effect of the Invention

As is clear from the above description, the image reading apparatus embodied by the invention initially compares an image signal read from an image medium to the preset threshold value, and then detects either the relative position of the image medium in the reading region or the size of the image medium in correspondence with the detected value. As a result, irrespective of the conveyed position or the size of the image medium, the image reading apparatus can constantly and precisely read the image region with a simple mechanism.

Furthermore, since the image reading apparatus embodied by the invention is provided with a means for specifying the image reading region and a means for specifying the size of pixels to be read, desired image region can securely be read based on the desired pixel size.

What I claimed is:

1. An image reading apparatus comprising:
   an irradiating means for irradiating light beam onto an image medium in main-and-subscanning directions;
   a reading means for reading light beam transmitted through or reflected from said image medium in the main scanning direction;
   a reading control means for inhibiting said reading means from reading said transmitted or reflected light while said irradiating means irradiates light beam onto said image medium in the subscanning direction from its tip edge across predetermined distance;
   a photoelectric conversion means for converting said transmitted or reflected light read by said reading means into an image signal;
   a memory means for storing a predetermined threshold value;
   a comparison means for comparing signal output from said photoelectric conversion means with said threshold value;
   a discriminating means for discriminating relative position of said image medium with respect to said reading means or size of said image medium based on the signal output from said comparison means; and
   a reading-area setting means for setting reading area of said image medium based on the signal output from said discriminating means.

2. The image reading apparatus as set forth in claim 1, further comprising a conveying means for conveying said image medium to a position at which said irradiating means again irradiates light beam onto said image medium from its tip edge after causing said irradiating means to irradiate light beam onto said image medium in the subscanning direction from its tip edge across predetermined distance.

3. An image reading apparatus comprising;
   an irradiating means for irradiating light beam onto an image medium in main-and-subscanning directions;
   a reading means for reading light beam transmitted through or reflected from said image medium in the main scanning direction;
   a photoelectric conversion means for converting said transmitted or reflected light read by said reading means into an image signal;
   a memory means for storing a predetermined threshold value;
   a comparison means for comparing signal output from said photoelectric conversion means with said threshold value;
   a discriminating means for discriminating relative position of said image medium with respect to said reading means or size of said image medium based on the signal output from said comparison means;
   a reading-control means for reading transmitted or reflected light of said light beam in the main scanning direction a different positions in the subscanning direction of said image meidum;
   an inclination-discriminating means for discriminating inclination of said image medium with respect to the subscanning direction based on the signal output from said reading-control means; and
   a reading-area setting means for setting-area of said image medium based on the signals output from said inclination-discriminating means.

4. An image reading apparatus comprising:
   an irradiating means for irradiating light beam onto an image medium in main-and-subscanning directions;
   a reading means for reading light beam transmitted through or reflected from said image medium in the main scanning direction;
   a photoelectric conversion means for converting said transmitted or reflected light read by said reading means into an image signal;
   a memory means for storing a predetermined threshold value;
   a comparison means for comparing signal output from said photoelectric conversion means with said threshold value;
   a discriminating means for discriminating relative position of said image medium with respect to said reading means or size of said image medium based on the signal output from said comparison means; and
   a reading-area setting means for setting reading area of said image medium based on the signal output from said discriminating means.
   a reading-control means for reading transmitted or reflected light of said light beam in the main scanning direction at different positions in the subscanning direction of said image medium;
   an inclination-discriminating means for discriminating inclination of said image medium with respect to the sub-scanning direction based on the signal output from said reading-control means; and
   a reading-area setting means for setting-area of said image medium based on the signals output from said inclination-discriminating means; and
   an alarm means for generating alarm when it is discriminating that said image-medium reading area cannot be set based on signal output from said reading-area setting-possibility discriminating means.

5. An image reading apparatus comprising:
   an irradiating means for irradiating light beam onto an image medium in main-and-subscanning directions;
   a reading means for reading light beam permeated through or reflected from said image medium in the main scanning direction;
   a photoelectric conversion means for converting into an image signal said permeated or reflected light read by said reading means;
   a memory means for storing a predetermined threshold value;
   a comparison means for comparing signal output from said photoelectric conversion means with said threshold value;

a discriminating means for discriminating relative position of said image meidum with respect to said reading means or size of said image medium based on the signal output from said comparison means; and a reading-area setting means for setting reading area of said iamge medium based on the signal output from said discriminating means; characterized in that said photoelectric conversion means is a linear amplifier and a log amplifier and further comprising;

an operating-condition discriminating means for discriminating whether said image reading apparatus operates to set reading area of said image medium or to read said image medium; and a switching means for switching operational mode of said linear amplifier and said log amplifier based on the signal output from said operating-condition discriminating means at the time of setting of the reading area of said image medium.

* * * * *